Nov. 1, 1932.  F. R. RANGEL  1,885,545
VEHICLE WHEEL
Filed March 17, 1932
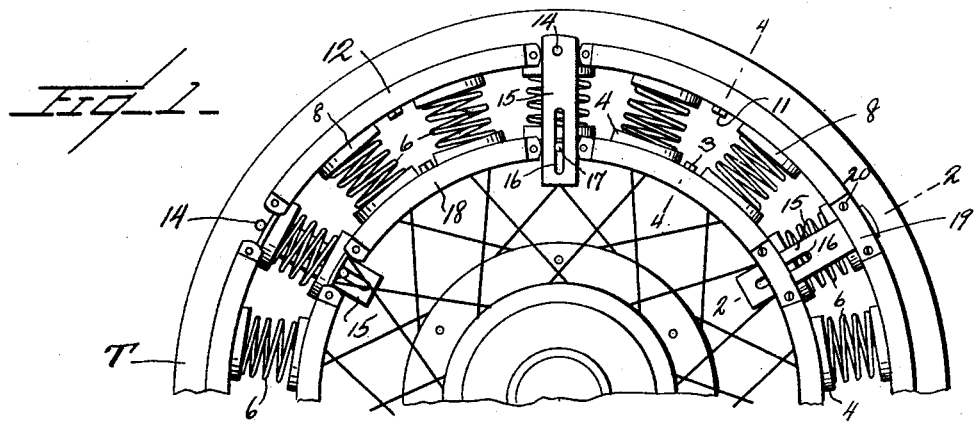
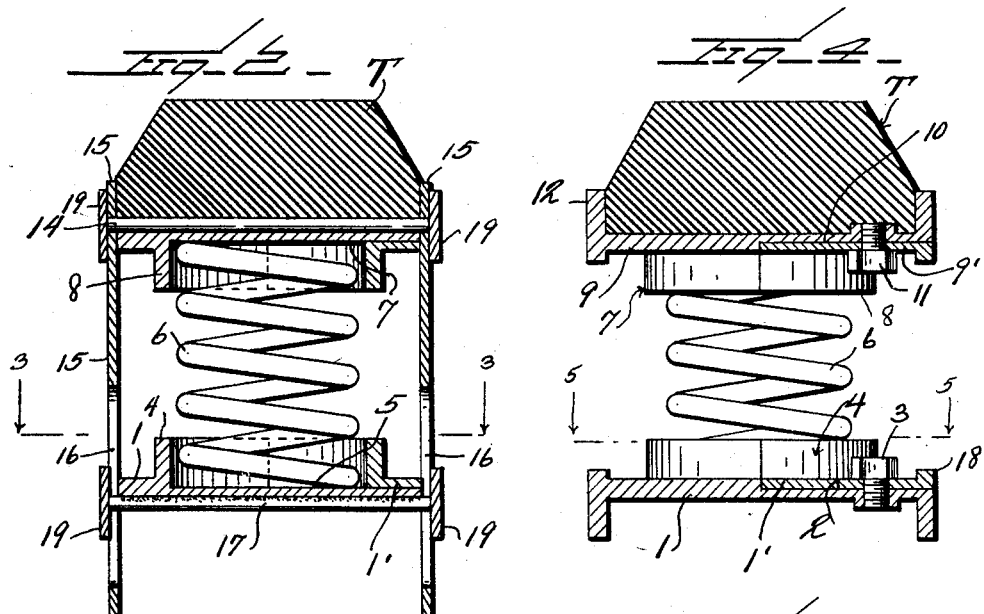
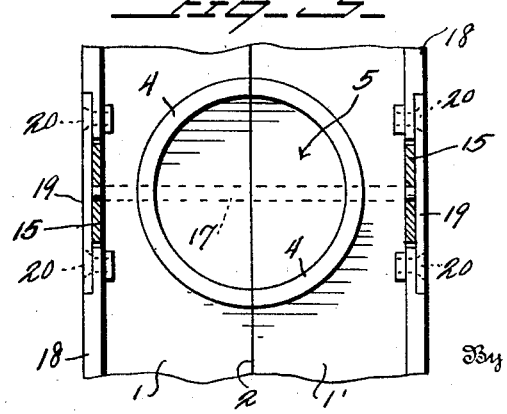
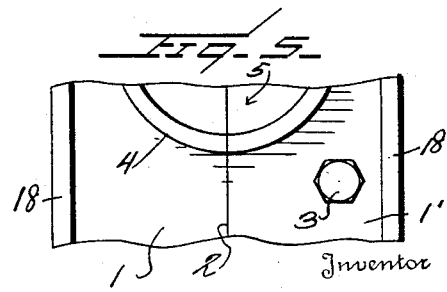
Inventor
Felipe Rangel Rangel
By Watson E. Coleman
Attorney Patented Nov. 1, 1932

1,885,545

UNITED STATES PATENT OFFICE

FELIPE RANGEL RANGEL, OF HABANA, CUBA

VEHICLE WHEEL

Application filed March 17, 1932. Serial No. 599,502.

This invention relates to a vehicle wheel, and it is primarily an object of the invention to provide a device of this kind constructed in a manner whereby the felly of the wheel is yieldingly supported so that a solid tire can be employed in connection with the felly with the same resultant ease and convenience of use as now obtained by the use of pneumatic tires.

The invention also has for an object to provide a device of this kind comprising an inner rim and an outer felly together with cushioning means interposed therebetween whereby the outer felly and the inner rim may have relative movement under tension in simulation of a pneumatic tire and also wherein means are provided to obtain an effective driving connection between the inner rim and the outer felly.

The invention consists in the details of construction and in the combination and arrangement of the several parts of my improved vehicle wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in side elevation of a wheel constructed in accordance with an embodiment of my invention;

Figure 2 is an enlarged fragmentary sectional view taken substantially on the line 2—2 of Figure 1;

Figure 3 is a fragmentary detailed sectional view taken substantially on the line 3—3 of Figure 2;

Figure 4 is a detailed sectional view taken substantially on the line 4—4 of Figure 1;

Figure 5 is a fragmentary view in top plan illustrating the structure as particularly indicated by line 5—5 of Figure 4.

As disclosed in the accompanying drawing, 1 denotes an inner rim of desired radius and which has one side portion reduced in thickness from above to provide a rabbet 2 in which is snugly engaged a supplemental rim 1'. This rim 1' is maintained in assembled relation with respect to the rim 1 through the instrumentality of a plurality of circumferentially spaced holding screws 3. At desired points spaced circumferentially thereof the rims 1 and 1' are provided with the outstanding arcuate flanges 4, the flanges 4 coacting to provide a plurality of seats 5 each of which being adapted to receive an end portion of a coil spring 6 of desired tension. The opposite or outer end portion of the spring 6 is received within a seat 7 provided by the coacting flanges 8 carried by the felly 9 and its associated supplemental felly 9'.

The supplemental felly 9' snugly engages within a rabbet 10 provided in the inner surface of the felly 9 around a marginal portion thereof. The fellys 9 and 9' are maintained in assembled relation by the plurality of circumferentially spaced holding screws 11.

The marginal portions of the felly 9 are defined by the outstanding flange sections 12 for retaining the tire T in applied position thereon. The flange sections 12, as herein disclosed, are of equal length and with the ends of adjacent sections 12 spaced apart. Rods 14 are directed transversely across the outer face of the felly 9 and extend beyond the opposite sides thereof with the extended end portions of each of the rods 14 being arranged within the space between adjacent ends of the flange sections 12. The extended portion of each rod 14 is engaged through an end portion of an elongated flat rigid link 15. Each of these links 15 is of a length to bridge at all times the space between the felly 9 and the rim 1 and to extend inwardly beyond the rim 1. The inner portion of each of the links 15 is provided with a longitudinally disposed slot 16 through which is disposed an extended end portion of a rod 17 secured transversely across the inner face of the rim 1. Through the instrumentality of the links 15 the felly 9 and rims 1 are in effective driving connection yet at the same time the felly 9 is free to have the desired yielding movement with respect to the rim 1.

Each of the links 15 is also disposed through the spaces between adjacent side flanges 18 defining the marginal portions of the rim 1. As clearly illustrated in Figure 1 the end portions of the flange sections 12 and 18 are so rounded as to allow the links 15 to have a certain degree of swinging movement to assure the effective relative movement between the rim 1 and felly 9.

The space between adjacent flange sections 12 or flange sections 18 is bridged by an elongated plate 19, the extremities of which being bolted or otherwise attached, as at 20, to said adjacent end portions of the flange sections 12 or 18. Each of these applied plates 19 also extends across the outer face of a link 15 and thereby provide effective means for maintaining said link 15 in desired applied or working position.

From the foregoing description it is thought to be obvious that a vehicle wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A wheel structure comprising a rim, a felly disposed therearound and spaced therefrom, flange sections carried by the marginal portions of the rim and felly, adjacent sections being spaced, rigid links pivotally connected to the felly between adjacent flange sections, the free end portions of the links being disposed between adjacent ends of the flange sections of the rim, parts carried by the rim between the flange sections engaging within slots in the links, and cushioning elements interposed between the rim and felly.

2. A wheel structure comprising a rim, a felly disposed therearound and spaced therefrom, flange sections carried by the marginal portions of the rim and felly, adjacent sections being spaced, rigid links pivotally connected to the felly between adjacent flange sections, the free end portions of the links being disposed between adjacent ends of the flange sections of the rim, parts carried by the rim between the flange sections engaging within slots in the links, cushioning elements interposed between the rim and felly, and plates bridging the spaces between adjacent flange sections of the rim and felly and extending across the links.

In testimony whereof I hereunto affix my signature.

FELIPE RANGEL RANGEL.